Figure 1:
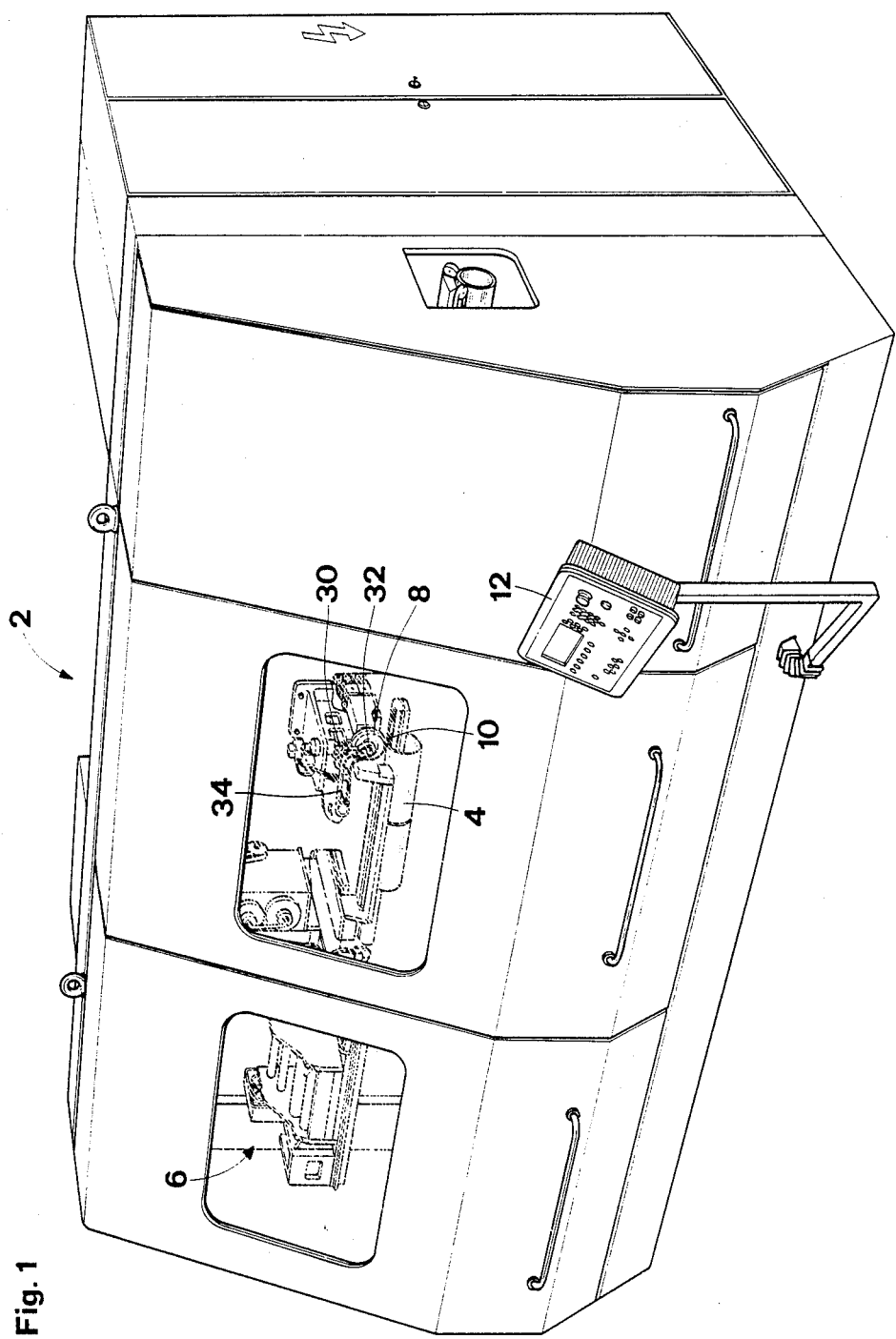

United States Patent [19]

Frei et al.

[11] Patent Number: 4,803,325
[45] Date of Patent: Feb. 7, 1988

[54] RESISTANCE SEAM WELDING MACHINE

[75] Inventors: Matthias Frei, Wettingen; Willi Mueller, Berikon; Werner Sutter, Oberehrendingen, all of Switzerland

[73] Assignee: Elpatronic AG, Switzerland

[21] Appl. No.: 141,927

[22] Filed: Jan. 6, 1988

[30] Foreign Application Priority Data

Feb. 9, 1987 [CH] Switzerland .................. 00446/87

[51] Int. Cl.⁴ .............................................. B23K 1/16
[52] U.S. Cl. .................................... 219/64; 219/82; 219/116
[58] Field of Search ................... 219/64, 81, 82, 83, 219/84, 88, 116

[56] References Cited

U.S. PATENT DOCUMENTS 1,322,479 11/1919 Buchenberg .................... 219/81
4,160,892 7/1979 Opprecht .
4,641,008 2/1987 Portmann .

*Primary Examiner*—H. Broome
*Assistant Examiner*—Melissa C. Chiu
*Attorney, Agent, or Firm*—McCormick, Paulding and Huber

[57] ABSTRACT

A resistance seam welding machine is described, particularly for the longitudinal seam welding of can bodies, wherein, in the secondary loop (16), feed and return lines are constructed partially as a double line (18, 28) and in all the remaining portion (18a, 18b, 18c, 20, 24, 26) in the form of a substantially coaxial line. The voltage loss occurring in the secondary loop (16) between welding transformer (14) and welding position (8, 10) and the heat due to energy losses in the machine parts adjacent to the secondary loop are considerably reduced as a result of this construction of the feed return lines.

11 Claims, 4 Drawing Sheets

RESISTANCE SEAM WELDING MACHINE

The invention relates to a resistance seam welding machine, particularly for the longitudinal seam welding of can bodies, having a welding transformer and having a secondary loop consisting of feed and return lines with a pendulum roller head in which a pendulum arm carrying an upper electrode roller is mounted for rotation, having a lower arm carrying a lower electrode roller, having a first busbar leading from the welding transformer to the pendulum roller head and having a second busbar leading from the welding transformer to the lower arm.

A resistance seam welding machine of the above-mentioned type is known ("Energy Exchange from the Welding Point to the Power Mains with Resistance Welding", W. Glage, Widerstandsschweissen III, Vorträge der 6. Stuttgarter Sondertagung Widerstands-Schweisstechnik 1965, Deutscher Verlag für Schweisstechnik (DVS) GmbH, Düsseldorf, 1965, pages 53–69, particularly page 57). As a result of the high current strengths in the secondary circuit of such seam welding machines, the inductances and ohmic resistances—even if very low—have great importance since the values of the impedance, low in themselves and generally only to be expressed in micro-ohms, lead to high active and reactive voltage losses as a result of multiplication by the welding current. The geometrical shape of the secondary loop has a decisive influence on the magnitude of the welding current $I_2$. The geometric shape of the secondary loop determines the inductance thereof and hence—together with the ohmic resistance—the secondary impedance Z. Multiplication by he welding current $I_2$ results in the said voltage loss ($\Delta U = ZI_2$) which may be so great that the residual voltage component from the secondary terminal voltage at the work to be welded is at best ¼ to 1/6 of the terminal voltage. In order to reduce this voltage loss, the following are given as the most important measures in connection with the known machine (above, pages 57 and 58):

1. Keeping the secondary loop as small as possible
2. Using materials which are as good conductors as possible.
3. Keeping secondary contact resistances as low as possible by means of fixed, clean and sufficiently large contacts.
4. Not producing any flow constrictions.
5. Watching out for current displacement.
6. Bringing as little magnetic material as possible within range of the secondary magnetic field.
7. Avoiding current losses (shunts) in the workpieces and apparatus.

It is given as an example for the known seam welding machine (above, FIG. 6), that the inductive resistance of the seam welding machine was able to be reduced by 50% by different laying of the feed line to the upper seam head. The alternating currents with a high current density occurring during resistance welding also require attention to be paid to the current displacement (and the eddy currents) however, as mentioned above. On the other hand, feed and return lines should be brought as close together as possible for the sake of the satisfactory geometrical shape of the secondary loop and on the other hand, the spacing should be selected as great as possible because of the superimposing of the magnetic fields of the two lines. There is a certain range between these two opposite requirements wherein there is an optimum between rising resistance and falling inductance. If the feed and return lines of the current are arranged so far apart that the magnetic fields of the two lines cannot have any noticeable effect on one another, the secondary loop would be too large. If the distance between feed and return lines is short, the unilateral current displacement occurs, which is also called the proximity effect, resulting from the superimposition of the magnetic fields of feed and return lines.

It is a further problem with such resistance seam welding machines that electrically conducting parts of the machine, which are not part of the secondary loop at all, become greatly heated in the magnetic field which surrounds the feed and return lines, namely by eddy currents. If the welding current has the usual frequency of 500 Hz, the heating by eddy currents may assume considerable proportions. As a result, parts consisting of a metal which is a good electrical conductor can reach temperatures of over 100° C in the shortest time, for example one minute. Such heat due to energy losses must be removed from these parts which involves considerable cooling problems. There may, however, be parts in the region of the secondary loop which cannot be cooled at all, for example chains with conveying dogs which convey the can bodies to the welding position between the electrode rollers. In order not to let these problems arise at all in the first place, in known resistance seam welding machines for the longitudinal seam welding of can bodies, the first busbar and the lower arm are disposed at such a great distance apart that to appreciable heating of the said conveying devices can occur and machine parts inevitably present in the region of the magnetic fields from the first busbar are effectively cooled internally. This is associated with the disadvantage, however, that the requirement of keeping the secondary loop as small as possible is no longer met.

It is the object of the invention to reduce considerably the voltage loss in the secondary loop and the heating of the parts surrounding this, in a simple manner in a resistance seam welding machine of the type mentioned at the beginning.

This problem is solved, according to the invention, in a resistance seam welding machine of the type having a particular arrangement of the feed and return lines.

Because of the coaxial or coaxial-like arrangement of feed and return lines, the resistance seam welding machine according to the invention, has a very small secondary loop with small spacing between the lines with which, in addition, the fact is utilized that with a coaxial line, a magnetic field is mainly present in the interior and is practically not longer an influence externally at even a short distance away. As a result of the formation of the secondary loop according to the invention, not only is the impedance of the secondary circuit reduced but also the heat losses occurring outside the secondary loop are reduced without the use of the machine becoming more complicated as a result. The region in which conveying dogs and the like move during the longitudinal seal these do not become appreciably heated. Very littler heating likewise occurs in the surroundings of the secondary loop. This heating is the less, the more closely the arrangement of feed and return lines approaches a coaxial line.

Experiments explained in more detail below in connection with the illustrated descriptions have shown that the voltage loss in the secondary loop could be reduced from about 7 to 7.8 V/m to about 2.6 to 2.9

V/m, that is to say by more than 50% by the invention in comparison with known resistance seam welding machines for the longitudinal seam welding of can bodies.

Advantageous developments of the invention form the subject of the sub-claims.

In the development of the invention, as a result of the special coaxial arrangement of first busbar and pendulum arm movable therein, the voltage loss is drastically reduced at a particularly critical point in the secondary loop. As a result of the current transmission extending over a circumference of 360° by means of the current leads from the first busbar to the pendulum roller head, not only is the closed coaxial arrangement between first busbar and pendulum roller head on the one hand and pendulum arm on the other hand ensure but also, as regards the current transmission from the pendulum roller head to the pendulum arm through the mercury in comparison with unilateral or pointwise current transmission to the pendulum roller head, a considerably increased service life thereof results because temperature concentrations between mercury and pendulum arm due to unilateral current transmission are avoided. A temperature concentration at this point would also have had the disadvantage that the mercury would form a compound with the surrounding copper (amalgamization) and as a result the current transmission would be impaired.

In the development of the invention according to claim 5, two quite flat conductors are used as first and second busbar respectively, which are arranged close beside one another. Since very few losses occur in this region of the secondary loop in this manner, the welding transformer can be disposed at a distance from the control panel so that it does not hamper the conveying of can bodies and the like and the longitudinal seam welding thereof.

In the development of the invention according to claims 6 to 10 the division of the first busbar into a plurality of longitudinal bars not only affords the possibility of being able to arrange the first busbar and lower arm a short distance apart in the manner of a coaxial line but also of being able to dispose conveying dogs and the like in a substantially field-free area. As a result, not only can the requirements for a small secondary window and narrow line spacing be met but also the requirement that the area adjacent to the counter-conductor should be as large as possible.

Examples of embodiment of the invention are described in more detail below with reference to the drawings.

Figure 2:
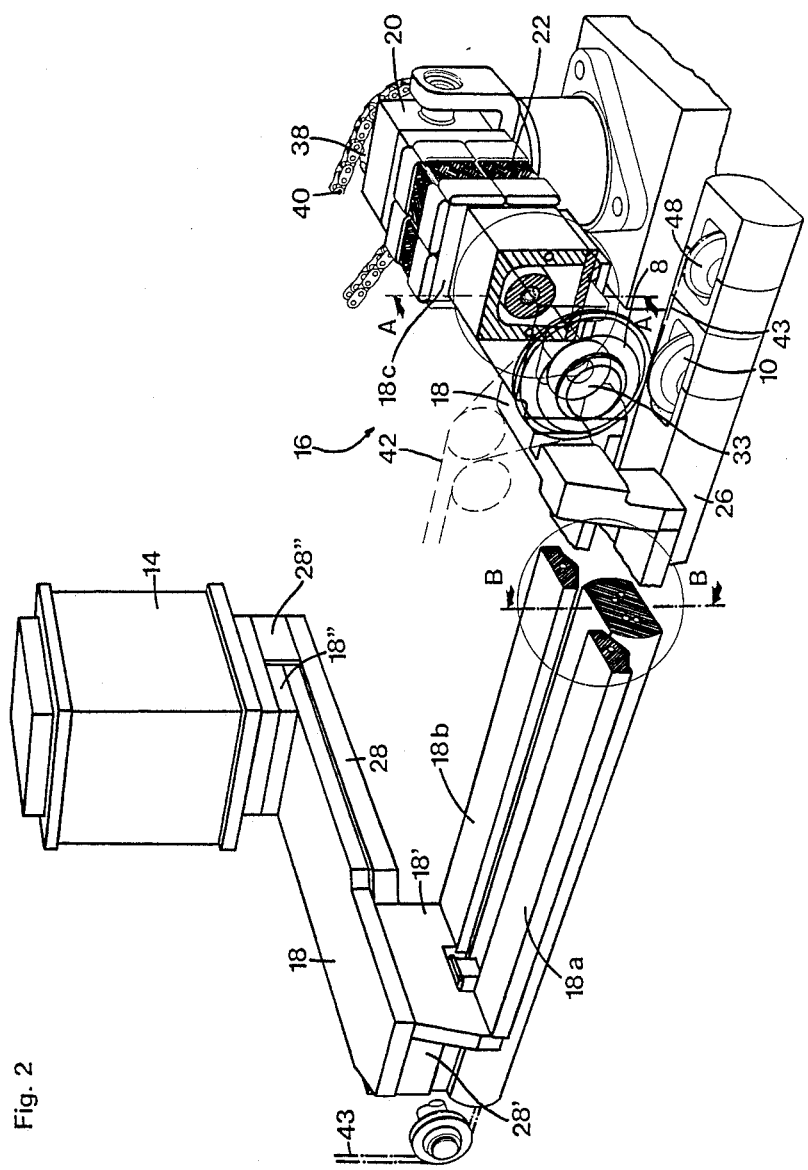
Figure 3:
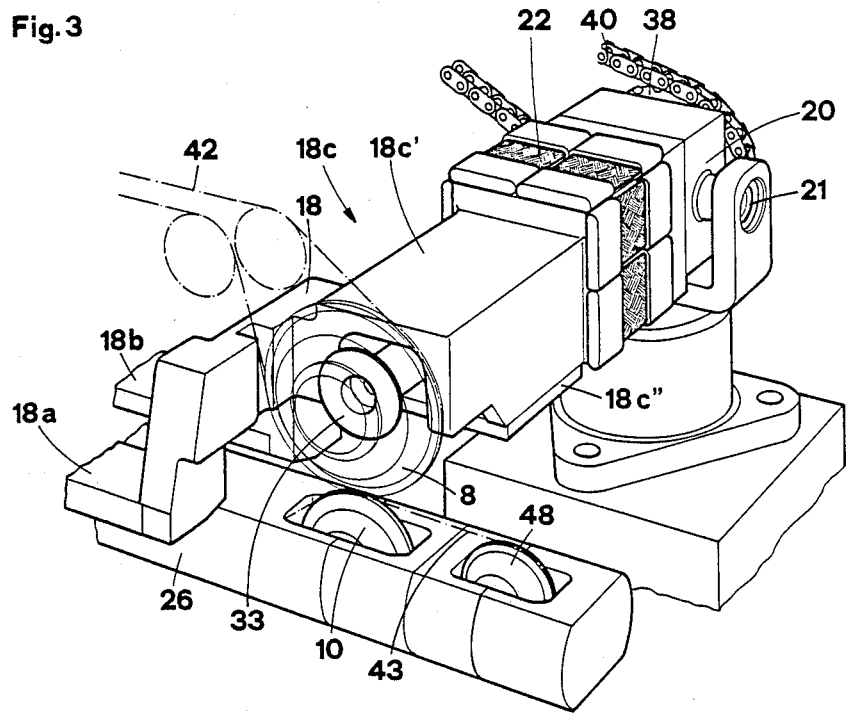
Figure 4:
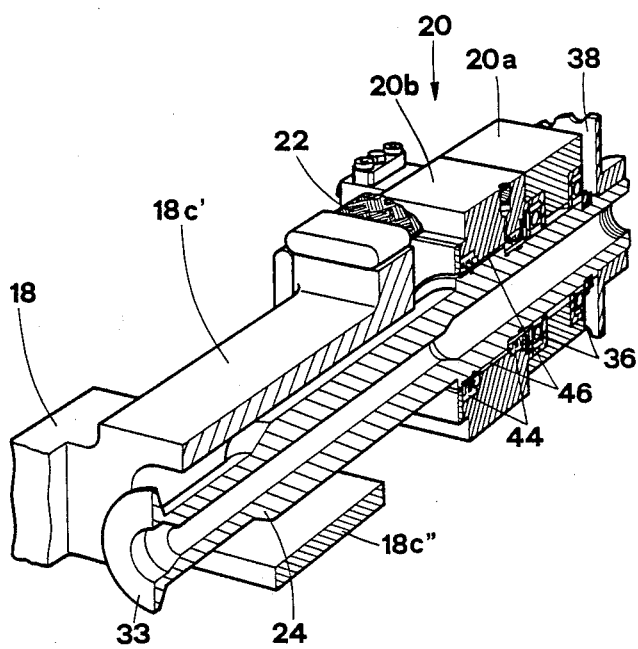
Figure 5:
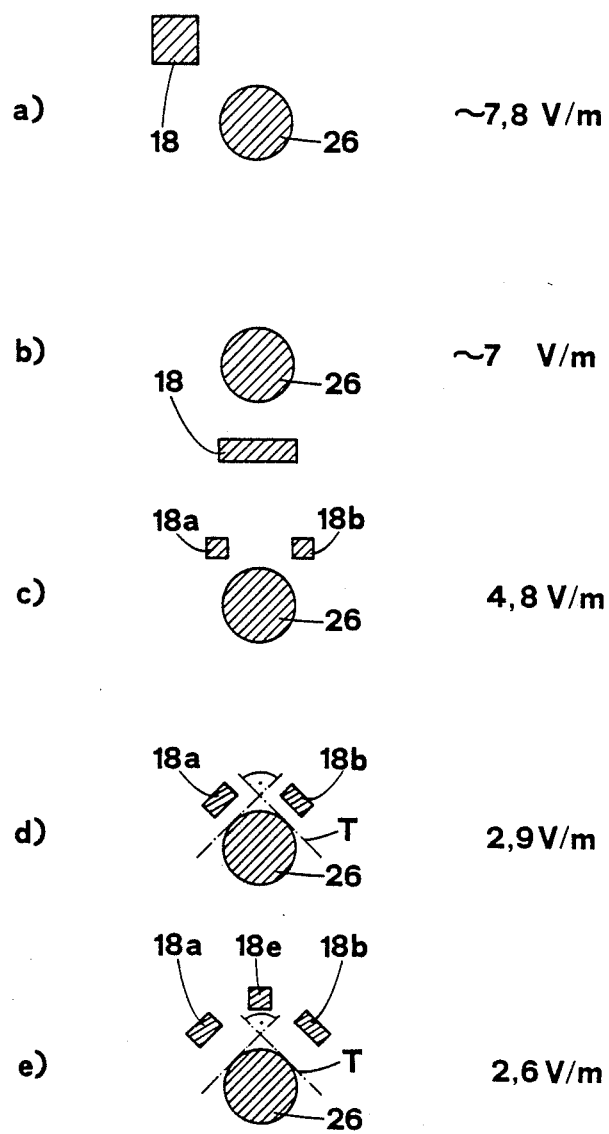

FIG. 1 shows one form of embodiment of a resistance seam welding machine according to the invention which is provided for the longitudinal seam welding of can bodies, FIG. 2 shows the welding transformer with the secondary loop for the resistance seam welding machine of FIG. 1, FIG. 3 shows a portion of the secondary loop of FIG. 2, illustrated on a larger scale, FIG. 4 shows a portion of the secondary loop of FIG. 2 in a longitudinal sectional view and FIG. 5 examples of known arrangements and arrangements according to the invention of the lower arm and of the portion of the first busbar arranged parallel to this.

FIG. 1 shows a general view of a resistance seam welding machine 2 for welding can bodies 4. Blanks for the can bodies to be formed are supplied through a bending and straightening station 6, formed to a cylindrical shape by means of guide jaws, not visible, brought into an overlapping position at the position of the longitudinal seam to be produced, by means of a Z-rail, likewise not visible, and are introduced, in this state between an upper electrode roller 8 and a lower electrode roller 10 by means of a conveyor chain, likewise not visible, carrying conveying dogs, for the longitudinal seam welding. All this is known, for example from the U.S. Pat. No. 4,160,892 going back to the Applicants themselves and therefore does not need to be described in more detail here. The machine is controlled by means of a control board 12 which is displaceable horizontally if necessary.

FIG. 2 shows, as a detail of the resistance seam welding machine 2 of FIG. 1, its welding transformer 14 with the secondary loop 16 consisting of feed and return lines. The feed line, that is to say the line leading to the upper electrode roller 8 consists of a first busbar 18, a pendulum roller head 20, which is electrically connected to the adjacent part 18c of the first busbar 18 by flexible current leads 22 in a manner to be explained in more detail below, and a pendulum arm 24 which is rotatably mounted at one end in a pendulum roller head 20 and carries the upper electrode roller 8 at the other end. The return line, that is to say the line leading back from the lower electrode roller 10 to the welding transformer 14, consists of a lower arm 26 carrying the lower electrode roller 10 at one end and connected, at the other end, to a second busbar 28 leading to the welding transformer 14. In the region of the secondary loop situated between the welding transformer 14 and the lower arm 26, the first busbar 18 and the second busbar 28 are laid in the form of a parallel line (so-called double line) and given a rectangular cross-section as illustrated in FIG. 2. In the rest of the secondary loop, the feed and return lines are laid in the form of a substantially coaxial line as is explained in more detail below.

FIG. 3 shows more fully the pendulum roller head 20 and the portion 18c of the first busbar 18 connected to this through the current leads 22 and, in particular, the pendulum bearing arrangement 28 of the pendulum roller head, which has been omitted in FIG. 2 for the sake of clarity. In earlier resistance seam welding machines, as in the one mentioned at the beginning for example, the head carrying the upper electrode roller was very heavy and inert, for which reason the welding spots were irregular and not satisfactory, particularly at the beginning of the longitudinal seam. In order to avoid this disadvantage, a pendulum roller head is used, constructed on the principle of a counterpoised balance, wherein the pendulum bearing arrangement 28 carries the whole weight and the upper electrode roller 8 rests on the lower electrode roller 10 practically without any weight. In order to adjust a specific contact pressure, a spring 30 (see FIG. 1) presses from above on the spindle 32 of the upper electrode roller. The spindle 32 is secured to the end of a pivotally mounted stirrup 34 which guides the upper electrode roller 8 vertically and in the welding direction. The pendulum arm 24 is constructed in the form of a hollow shaft (see FIG. 4) which has a mounting flange 33 for the electrode roller 8 at one end and, at the other end, is mounted for rotation in the pendulum roller head 20 by means of rolling bearings 36. Secured to this other end of the pendulum arm 24 is a toothed rim 38 through which a chain 40 can set the pendulum arm 24 and hence the upper electrode roller 8 in rotation. According to FIG. 3, guided onwards over the upper electrode rolller 8 is a flat wire electrode 42 which has a rectangular cross-section. A like flat wire electrode 43 is guided over the lower electrode roller 10. According to the illustration in FIG. 2, the flat wire electrode 43 is fed to the lower electrode roller 10 from the left, continues, at the top, towards the right, over an auxiliary roller 48 and then back towards the left again at the bottom. Such flat wire electrodes serve the purpose of preventing the electrode roller being contaminated by the formation of a compound with metal of the work being welded (for example tin if can bodies of tin plate have to be welded), as is known from the above-mentioned U.S. Pat. No. 4,160,892 and also from U.S. Pat. No. 4,641,008 going back to the Applicants and therefore likewise not needing to be explained further here.

The pendulum roller head 20 consists of two halves, namely the half 20a illustrated on the right in FIG. 4 and containing the rolling bearing 36 for the mounting of the pendulum arm 24, and the half 20b illustrated on the left in FIG. 4 and containing an annular chamber 46 between two sealing rings 44, which chamber is filled with liquid mercury which serves for the current transmission from the pendulum roller head 20 to the pendulum arm 24.

According to the illustration in FIGS. 3 and 4 and according to the sectional view in FIG. 2, the part 18c of the first busbar 18 adjacent to the pendulum roller head 20 consists of a portion 18c' which is U-shaped in cross-section and is closed at the bottom, over the greater portion of its length, by a plate 18c'' of the same material as the portion 18c'. The portion 18c of the first busbar 18 and the pendulum roller head 20 are electrically connected over the whole circumference round the pendulum arm 24 by the current leads 22. The pendulum arm is therefore surrounded, over its whole length, by the first busbar and the pendulum roller head. Only the upper electrode roller 8 shows from the portion 18c' which is U-shaped in cross-section. When the pendulum arm 24 executes a movement about the pendulum bearing arrangement 21, the flexible current leads 22 yield accordingly so that this movement of the pendulum arm is not hampered and this can move freely in relation to the stationary part 18c of the first busbar 18. The part 18c of one hand and the pendulum arm 24 on the other hand are therefore arranged in relation to one another like a coaxial line in which the welding current supplied to the upper electrode roller 8 flows towards the right in the part 18c in FIG. 4 as far as the mercury in the annular chamber 46, enters the pendulum arm 24 through the mercury and flows in this arm in the direction of the upper electrode roller 8, not illustrated in FIG. 4. Currents therefore flow in phase opposition in this coaxial line arrangement.

In the region between the lower arm 26 and the welding transformer 14, the first and second busbars 18 and 28 respectively have a flat, broad cross-section annd are disposed horizontally with broad sides of the cross-section adjacent to one another. At their right-hand ends, as they appear in the illustration of FIG. 2, they bend round upwards at a right-angle and are introduced vertically into the welding transformer 14. The mutual spacing of the vertically disposed portions 18'', 28'' of the busbars is equal to the mutual spacing of the horizontally disposed portions of these busbars so that everywhere between welding transformer 14 and lower arm 26, the requirement of a small spacing between the busbars 18, 28, through which the welding current flows in phase opposition, is met.

According to the illustration in FIG. 2 and 3, the lower arm 26 has a circular cross-section but flattened at the top and bottom. The first busbar 18 leads from the lower end of the welding transformer 14 at first horizontally towards the left (as seen in FIG. 2) then bends round at right-angles vertically downwards, the same applying to the course of the second busbar 28 in this region, only with the difference that its portion 28' extending vertically is parallel to the longitudinal axis of the lower arm 26 whereas the corresponding portion 18' extending vertically, of the first busbar 18, is at right-angles to the longitudinal axis of the lower arm. In the following region of the lower arm 26, in the direction of the pendulum arm 24, the first busbar 18 is divided into two longitudinal bars 18a, 18b which are arranged on a circle concentrically round the lower arm, at a short distance from this and are joined together again to form the remaining portion of the first busbar 18 before the lower electrode roller 10, this joined portion continuing in the part 18c which surrounds the pendulum arm 24 as explained above. The two longitudinal bars 18a, 18b are arranged symmetrically with respect to a vertical longitudinal central plane B—B of the lower arm 26. In the form of embodiment illustrated in FIG. 2, the longitudinal bars 18a, 18b are arranged parallel to the upper flattened portion of the cross-section of the lower arm 26 and the cross-sectional shape of the longitudinal bars 18a, 18b is adapted to the cross-sectional shape of the lower arm 26 at the side adjacent thereto, as can easily be seen from the sectional view ringed in FIG. 2.

There are several possibilities for the arrangement of the first busbar 18 adjacent to the lower arm 26, with different voltage losses, as illustrated diagrammatically in FIG. 5, and on the right in FIG. 5, the voltage losses per meter which result with each form of embodiment are given. FIGS. 5a and 5b show two known arrangements which were used in earlier resistance seam welding machines of the Applicants. In these known arrangements, the first busbar 18 has a relatively great spacing from the lower arm 26 as a result of which a voltage loss of 7.8 or 7 V/m occurs. FIG. 5c shows an arrangement which is equivalent to the arrangement according to the invention but with the difference that the longitudinal bars 18a, 18b have a square cross-section instead of a rectangular one and are not adapted to the shape of the lower arm 26. Even so, this arrangement already results in a substantial reduction in the voltage loss to 4.8 V/m. In the arrangement according to FIG. 5d, the longitudinal bars 18a, 18b are arranged parallel to two tangents T of the circular cross-section of the lower arm 26, which tangents intersect at 90°, and in the arrangement according to FIG. 5e a third longitudinal bar 18e is additionally provided which is arranged centrally in the vertical longitudinal central plane B—B of the lower arm 26 whereas the other two longitudinal bars 18a, 18b are arranged symmetrically with respect to the longitudinal central plane and again parallel to two tangents of the circular cross-section of the lower arm 26, which tangents intersect at 90° as in FIG. 5d. FIGS. 5d and 5e show that a reduction in the voltage loss to 2.9 and 2.6 V/m respectively is achieved. With the form of embodiment illustrated in FIG. 2, a voltage loss is achieved which is of the order of magnitude of the voltage loss according to FIG. 5d.

The bores in the longitudinal bars 18a, 18b and in the lower arm 26, which are visible in the sectional view in FIG. 2 are parts of a cooling water circuit, not described in more detail here, for the electrode rollers 8, 10, the auxiliary roller 48 and the pendulum roller head 20.

We claim:

1. A resistance seam welding machine, particularly for the longitudinal-seam welding of can bodies (4), having a welding transformer (14) and having a secondary loop (16) consisting of feed and return lines, with a pendulum roller head (20) in which a pendulum arm (24) carrying an upper electrode roller (8) is mounted for rotation, having a lower arm (26) carrying a lower electrode roller, having a first busbar (18) leading from the welding transformer (14) to the pendulum roller head (20) and having a second busbar (28) leading from the welding transformer (14) to the lower arm (26), characterized in that the feed and return lines in the region of the secondary loop (16) situated between the welding transformer (14) and the lower arm (26) being a parallel line and in the region of the pendulum roller head (20) being in the form of a coaxial line.

2. A resistance seam welding machine according to claim 1, characterized in that the first busbar (18) and over the whole of its length.

3. A resistance seam welding machine according to claim 1, characterized in that the first busbar (18) and the pendulum roller head (20) are electrically connected to one another through current leads (22) over the entire circumference round the pendulum arm (24).

4. A resistance seam welding machine according to claim 1, characterized in that the first busbar (18), in its whole portion (18c) surrounding the pendulum arm, has a U-shaped cross-section, closed at the ends of the U arms.

5. A resistance seam welding machine according to claim 1, characterized in that the two busbars (18, 28) have a flat, broad rectangular cross-section in the region between the lower arm (26) and the welding transformer and are disposed horizontally with broad sides of the cross-section adjacent to one another and are then introduced vertically into the welding transformer (14) and that the mutual spacing of the vertically arranged portions (18″, 28″) of the busbars (18, 28) is equal to the mutual spacing of the horizontally arranged portions of the busbars.

6. A resistance seam welding machine according to claim 1, characterized in that the lower arm (26) has a cross-section which is circular at the top and flattened at the bottom and that the first busbar (18) is divided, in the region of the lower arm (26), into a plurality of longitudinal bars (18a, 18b) which are disposed on a circle concentrically around the lower arm (26) at the short distance from this and are again joined to the first busbar before the lower electrode roller (10).

7. A resistance seam welding machine according to claim 6, characterized in that the first busbar (18) is divided into at least two longitudinal bars (18a, 18b) which are disposed symmetrically with respect to a vertical longitudinal central plane of the lower arm (26).

8. A resistance seam welding machine according to claim 7, characterized in that the longitudinal bars (18a, 18b) are disposed parallel to one of the flattened cross-sectional portions of the lower arm (26).

9. A resistance seam welding machine according to claim 8, characterized in that the cross-sectional shape of the longitudinal bars (18a, 18b) is adapted, at the side adjacent to the lower arm (16), to the cross-sectional shape thereof (FIG. 2).

10. A resistance seam welding machine according to claim 7, characterized in that the longitudinal bars (18a, 18b) are disposed parallel to two tangents (T) of the circular cross-section of the lower arm (26), which tangents intersect at 90° (FIG. 5d).

11. A resistance seam welding machine according to claim 7, characterized in that the first busbar (18) is divided into three longitudinal bars (18a, 18b, 18e), one of which is disposed centrally in the vertical longitudinal central plane of the lower arm (26) and the other two are disposed symmetrically to the longitudinal central plane and parallel to two tangents (T) of the circular cross-section of the lower arm (26), which tangents intersect at 90° (FIG. 5e).

* * * * *

UNITED STATES PATENT AND TRADEMARK OFFICE
CERTIFICATE OF CORRECTION

PATENT NO. : 4,803,325

DATED : February 7, 1989

INVENTOR(S) : Frei, et al.

It is certified that error appears in the above-identified patent and that said Letters Patent is hereby corrected as shown below:

On the title page:

Item [45] Date of Patent: delete "Feb. 7, 1988" and substitute--Feb. 7, 1989--.

Signed and Sealed this

Thirty-first Day of July, 1990

*Attest:*

HARRY F. MANBECK, JR.

*Attesting Officer*   *Commissioner of Patents and Trademarks*